(12) United States Patent
Kariyama et al.

(10) Patent No.: US 9,415,831 B2
(45) Date of Patent: Aug. 16, 2016

(54) BICYCLE HYDRAULIC OPERATING DEVICE (71) Applicant: SHIMANO INC., Sakai (JP)

(72) Inventors: Osamu Kariyama, Sakai (JP); Tatsuya Matsushita, Sakai (JP); Keiji Matsueda, Sakai (JP); Takashi Itou, Sakai (JP); Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 233 days.

(21) Appl. No.: 13/930,937

(22) Filed: Jun. 28, 2013

(65) Prior Publication Data
US 2015/0001018 A1 Jan. 1, 2015

(51) Int. Cl.
B60T 11/00 (2006.01)
B62L 3/02 (2006.01)
B62K 23/06 (2006.01)
B60T 11/21 (2006.01)
B60T 11/26 (2006.01)

(52) U.S. Cl.
CPC ............. B62L 3/023 (2013.01); B62K 23/06 (2013.01); B60T 11/26 (2013.01)

(58) Field of Classification Search
CPC ......... B60T 11/16; B60T 11/22; B60T 11/26; B60T 11/206; B60T 17/06; B62L 3/02; B62L 3/023; Y10T 74/20438; Y10T 74/20624; Y10T 74/20666; B62K 23/06
See application file for complete search history.

(56) References Cited

U.S. PATENT DOCUMENTS

| | | | | |
|---|---|---|---|---|
| 4,433,899 A * | 2/1984 | Sellet | ....................... | B62J 29/00 248/479 |
| 6,003,639 A * | 12/1999 | Buckley et al. | ................. | 188/26 |
| 7,178,646 B2 * | 2/2007 | Lumpkin | ...................... | 188/344 |
| 2003/0121262 A1 * | 7/2003 | Lumpkin | ........................ | 60/594 |
| 2005/0056508 A1 * | 3/2005 | Laghi | ............................ | 188/344 |
| 2008/0072697 A1 * | 3/2008 | Fujii | ............................. | 74/471 R |
| 2011/0240426 A1 * | 10/2011 | Hirose | .......................... | 188/344 |
| 2012/0160625 A1 * | 6/2012 | Jordan | .......................... | 188/344 |
| 2013/0255239 A1 * | 10/2013 | Miki | ...................... | B62L 3/023 60/325 |

* cited by examiner

Primary Examiner — Melody Burch
(74) Attorney, Agent, or Firm — Mori & Ward, LLP (57) ABSTRACT A bicycle hydraulic operating device comprises a bracket, a hydraulic cylinder, a piston, a lever, a fluid reservoir, and a lid. The bracket is configured to be mounted to a bicycle handlebar. The piston is movably disposed within the hydraulic cylinder. The lever is pivotally provided around a pivot axis relative to the bracket and is operatively coupled to the piston to move the piston within the hydraulic cylinder in response to pivotal movement of the lever. The fluid reservoir is disposed on the bracket and having an opening configured to face substantially in a downward direction in a state where the bracket is mounted to the bicycle handlebar. The lid is configured to cover the opening of the fluid reservoir.

28 Claims, 10 Drawing Sheets

BICYCLE HYDRAULIC OPERATING DEVICE

BACKGROUND OF THE INVENTION

1. Field of the Invention

The present invention relates to a bicycle hydraulic operating device.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. In recent years, some bicycles have been provided with a bicycle hydraulic system. The bicycle hydraulic system includes a hydraulic operating mechanism and a hydraulically actuated component, for example.

SUMMARY OF THE INVENTION

In accordance with a first aspect of the present invention, a bicycle hydraulic operating device comprises a bracket, a hydraulic cylinder, a piston, a lever, a fluid reservoir, and a lid. The bracket is configured to be mounted to a bicycle handlebar. The piston is movably disposed within the hydraulic cylinder. The lever is pivotally provided around a pivot axis relative to the bracket and is operatively coupled to the piston to move the piston within the hydraulic cylinder in response to pivotal movement of the lever. The fluid reservoir is disposed on the bracket and has an opening configured to face substantially in a downward direction in a state where the bracket is mounted to the bicycle handlebar. The lid is configured to cover the opening of the fluid reservoir.

In accordance with a second aspect of the present invention, the bicycle hydraulic operating device according to the first aspect is configured so that the lid is disposed between the fluid reservoir and the lever.

In accordance with a third aspect of the present invention, the bicycle hydraulic operating device according to the second aspect is configured so that the lid is disposed between the fluid reservoir and the pivot axis of the lever.

In accordance with a fourth aspect of the present invention, the bicycle hydraulic operating device according to the first aspect is configured so that the lever includes a first end portion and a second end portion opposite to the first end portion. The pivot axis is provided closer to the first end portion than to the second end portion. The lid is disposed between the fluid reservoir and the first end portion.

In accordance with a fifth aspect of the present invention, the bicycle hydraulic operating device according to the first aspect further comprises a flexible diaphragm disposed between the lid and the opening of the fluid reservoir.

In accordance with a sixth aspect of the present invention, the bicycle hydraulic operating device according to the first aspect is configured so that the bracket includes a mounting member configured to mount the bracket to the bicycle handlebar. The hydraulic cylinder is disposed on the bracket between the pivot axis of the lever and the mounting member.

In accordance with a seventh aspect of the present invention, the bicycle hydraulic operating device according to the first aspect further comprises an electric switch unit provided on the lever and configured to be electrically connected to a bicycle electric component.

In accordance with an eighth aspect of the present invention, the bicycle hydraulic operating device according to the first aspect further comprises a bleeding port configured to communicate with the fluid reservoir.

In accordance with a ninth aspect of the present invention, the bicycle hydraulic operating device according to the eighth aspect is configured so that the bleeding port is configured to face substantially in an upward direction in a state where the bracket is mounted to the bicycle handlebar.

In accordance with a tenth aspect of the present invention, a bicycle hydraulic operating device comprises a bracket, a lever supporting portion, a hydraulic cylinder, a piston, a lever, a fluid reservoir, and a lid. The bracket is configured to be mounted to a bicycle handlebar. The lever supporting portion has a receiving space. The piston is movably disposed within the hydraulic cylinder. The lever is pivotally provided around a pivot axis relative to the bracket and is partially disposed at the receiving space. The lever is operatively coupled to the piston to move the piston within the hydraulic cylinder in response to pivotal movement of the lever. The fluid reservoir is disposed on the bracket and has an opening configured to face the receiving space. The lid is configured to cover the opening of the fluid reservoir.

In accordance with an eleventh aspect of the present invention, a bicycle hydraulic operating device comprises a bracket, a hydraulic cylinder, a piston, a lever, a fluid reservoir, and a lid. The bracket is configured to be mounted to a bicycle handlebar. The piston is configured to be movably provided within the hydraulic cylinder. The lever is pivotally provided about a pivot axis relative to the hydraulic cylinder and is operatively coupled to the piston to move the piston within the hydraulic cylinder in response to pivotal movement of the lever. The fluid reservoir is disposed on the bracket and having an opening. The lid is configured to cover the opening of the fluid reservoir and is provided between the fluid reservoir and the brake lever.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Figure 1:
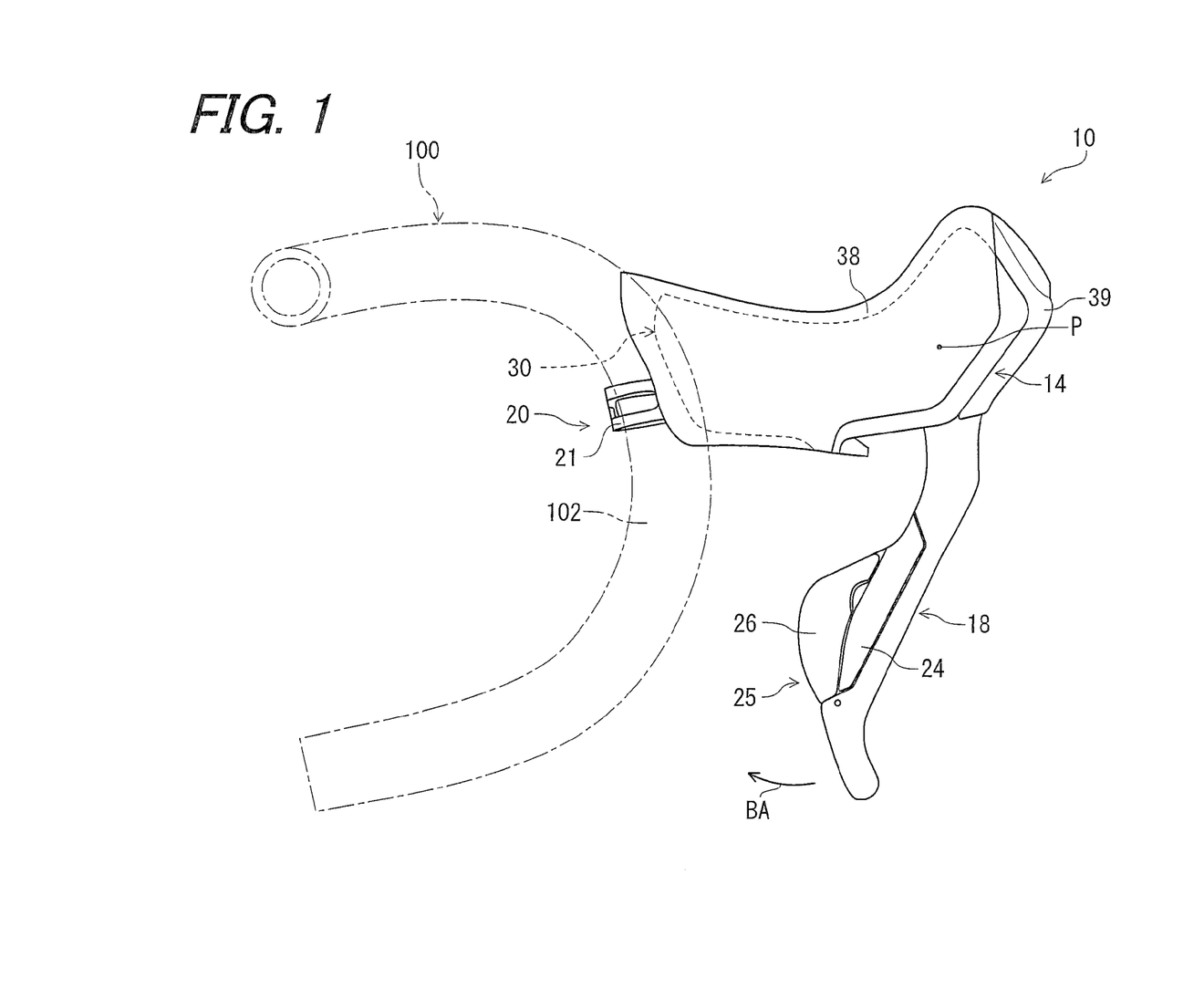
FIG. 1 is an elevational view of a bicycle hydraulic operating device in accordance with an embodiment of the present invention.

Referring initially to FIG. 1, a bicycle hydraulic operating device 10 in accordance with the embodiment is configured to operate a bicycle hydraulic brake device (not shown) and is configured to be mounted to a bicycle handlebar 100. The bicycle handlebar 100 is a dropdown bicycle handlebar, for example. The bicycle hydraulic operating device 10 is a right hand side control device operated by the rider's right hand to operate the hydraulic brake device and a shifting device (not shown, e.g., an electric rear derailleur or a hub transmission). It will be apparent to those skilled in the bicycle field that the configuration of the bicycle hydraulic operating device 10 can be adapted to a left hand side control device that is operated by the rider's left hand. In this embodiment, the following directional terms "forward", "rearward", "left", "right", "upward" and "downward" as well as any other similar directional terms refer to those directions which are determined on the basis of the rider who sits on a saddle (not shown) of a bicycle with facing the handlebar 100. Accordingly, these terms, as utilized to describe the bicycle hydraulic operating device 10 should be interpreted relative to a bicycle equipped with the bicycle hydraulic operating device 10 as used in an upright riding position on a horizontal surface.

As seen in FIG. 1, the bicycle hydraulic operating device 10 is mounted to a curved section 102 of the bicycle handlebar 100. In other words, the bicycle hydraulic operating device 10 is particularly designed for a bicycle that is equipped with the dropdown bicycle handlebar such as the bicycle handlebar 100. However, it will be apparent to those skilled in the bicycle field from this disclosure that the bicycle hydraulic operating device 10 could be applied to different types of handlebars if needed and/or desired. As explained below, the bicycle hydraulic operating device 10 includes both a braking function and a shifting function in a single unit. However, it will be apparent to those skilled in the bicycle field from this disclosure that the shifting function could be eliminated from the bicycle hydraulic operating device 10 if needed and/or desired. The bicycle hydraulic operating device 10 is a bicycle hydraulic brake operating device to operate the bicycle hydraulic brake device. However, it will be apparent to those skilled in the bicycle field from this disclosure that the technology disclosed herein can be applied to hydraulic systems of bicycle components other than the bicycle hydraulic brake operating device.

As illustrated in FIG. 1, the bicycle hydraulic operating device 10 comprises a bracket 14, a grip cover 38, a front cover 39, and a lever 18. The bracket 14 is configured to be mounted to the bicycle handlebar 100. In the illustrated embodiment, the grip cover 38 and the front cover 39 are attached to the bracket 14 to at least partially cover the bracket 14. The lever 18 is pivotally provided around a pivot axis P relative to the bracket 14. As explained below, the lever 18 is biased to a rest position with respect to the bracket 14. Thus, the lever 18 moves relative to the bracket 14 from the rest position along a brake operating path BA. The lever 18 actuates a hydraulic system (described later) upon movement of the lever 18 relative to the bracket 14 to perform a braking operation of the hydraulic brake device (not shown).

As seen in FIG. 1, the bicycle hydraulic operating device 10 further includes an electric switch unit 25. The electric switch unit 25 is provided on the lever 18 and is configured to be electrically connected to a bicycle electric component such as the shifting device (not shown). In the illustrated embodiment, the electric switch unit 25 includes a pair of operating members 24 and 26 configured to perform chain or gear shifting operations of the shifting device (not shown). The operating members 24 and 26 are electrically connected to a control unit (not shown). The operating members 24 and 26 are constructed as shown in U.S. Patent Application Publication No. 2009/0031841 A1 (assigned to Shimano, Inc.), for example. It will be apparent to those skilled in the bicycle field that the electric switch unit 25 can be eliminated from the bicycle hydraulic operating device 10 if needed and/or desired. Furthermore, it will be apparent to those skilled in the bicycle field that the operating members 24 and 26 are not limited to the illustrated structure and arrangement, but rather other suitable structures and arrangements can be used as needed and/or desired. The control unit is a microcomputer that is located in the bracket 14, for example. However, the control unit can be remotely located if needed and/or desired. Since various electrical shifting systems are known in the bicycle field, the operating members 24 and 26 and the control unit will not be discussed herein for the sake of brevity.

As illustrated in FIG. 1, the bracket 14 includes a mounting member 20 configured to mount the bracket 14 to the bicycle handlebar 100.

As illustrated in FIG. 1, the mounting member 20 is a handlebar clamp that is configured to be attached to the bracket 14 for releasably securing the bracket 14 to the curved section 102 of the bicycle handlebar 100. In the illustrated embodiment, the mounting member 20 is coupled to a handlebar attachment portion 30 of the bracket 14 and includes a band 21. The handlebar attachment portion 30 is arranged at an opposite side of the lever 18 and contacts the curved section 102 of the bicycle handlebar 100 when a fastener (not shown) is tightened to move the band 21 towards the handlebar attachment portion 30. It will be apparent to those skilled in the bicycle field that the mounting member 20 that is not limited to the illustrated clamp, but rather other suitable attachment mechanisms can be used as needed and/or desired.

Figure 2:
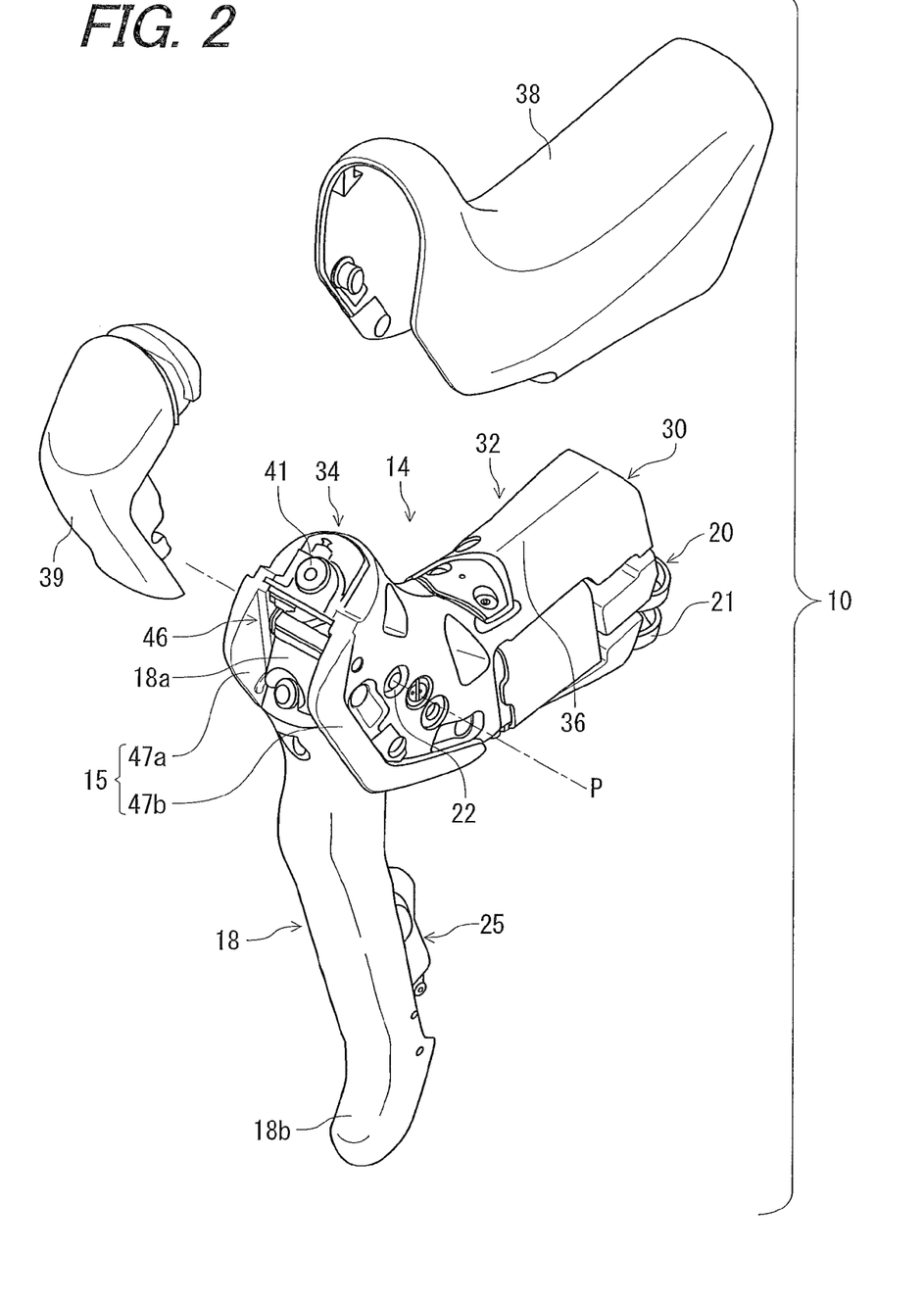
FIG. 2 is an exploded perspective view of the bicycle hydraulic operating device illustrated in FIG. 1.

Referring now to FIG. 2, the grip cover 38 and the front cover 39 are removably attached to the bracket 14. The grip cover 38 is removably attached to the bracket 14 to cover at least an upper surface and lateral side surfaces of the bracket 14. The front cover 39 is removably attached to the bracket 14 to cover a front surface of the bracket 14. The bracket 14 includes the handlebar attachment portion 30, a gripping portion 32 and a pommel portion 34. The bracket 14 is made of a rigid and hard material. The gripping portion 32 is located at a substantially middle portion of the bracket 14. The pommel portion 34 is located at a forward free end of the bracket 14. In other words, the gripping portion 32 is disposed between the handlebar attachment portion 30 and the pommel portion 34 along a longitudinal axis of the bracket 14 that is substantially parallel to a longitudinal axis of a bicycle in a state where the bracket 14 is mounted to the bicycle handlebar 100 attached to a bicycle. More specifically, the pommel portion 34 is located forward of the bracket 14 relative to a transition point on a top surface 36 of the bracket 14 in a state where the bracket 14 is mounted to the bicycle handlebar 100.

In the illustrated embodiment, the handlebar attachment portion 30, the gripping portion 32 and the pommel portion 34 are integrally provided as a one-piece unitary member. Of course, the handlebar attachment portion 30, the gripping portion 32 and the pommel portion 34 can have removable members as needed and/or desired. For example, an outer panel of the control unit can defines a part of the gripping portion 32.

As illustrated in FIG. 2, the grip cover 38 is stretched over the gripping portion 32 and a part of the pommel portion 34 to provide a cushion to the gripping portion 32 of the bracket 14 and to provide an attractive appearance. The front cover 39 is attached to a front portion of the pommel portion 34 to cover a bleeding plug 41 provided on the pommel portion 34. Typically, the grip cover 38 is made of elastic material such as rubber. The front cover 39 is made of a rigid and hard material such as synthetic resin. However, it will be apparent to those skilled in the bicycle field that materials of the grip cover 38 and the front cover 39 are not limited to rubber and synthetic resin respectively and any appropriate materials can be applied to the grip cover 38 and the front cover 39 if needed and/or desired.

As illustrated in FIG. 2, the bracket 14 further includes a lever supporting portion 15. The lever 18 is pivotally supported by the lever supporting portion 15 around a pivot axis P defined by a pivot pin 22 relative to the bracket 14. The lever supporting portion 15 has a receiving space 46 in which the lever 18 is pivotally supported around the pivot axis P. The lever supporting portion 15 includes a pair of supporting walls 47a and 47b spaced apart from each other along the pivot axis P. The pivot pin 22 is secured to the supporting walls 47a and 47b. The receiving space 46 is defined between the supporting walls 47a and 47b. The lever 18 is partially disposed at the receiving space 46. More specifically, the lever 18 includes a first end portion 18a and a second end portion 18b opposite to the first end portion 18a. The pivot axis P is provided closer to the first end portion 18a than to the second end portion 18b. The first end portion 18a is provided in the receiving space 46 between the supporting walls 47a and 47b. The second end portion 18b is provided outside the receiving space 46. A front section of the receiving space 46 is covered by the front cover 39.

Figure 3:
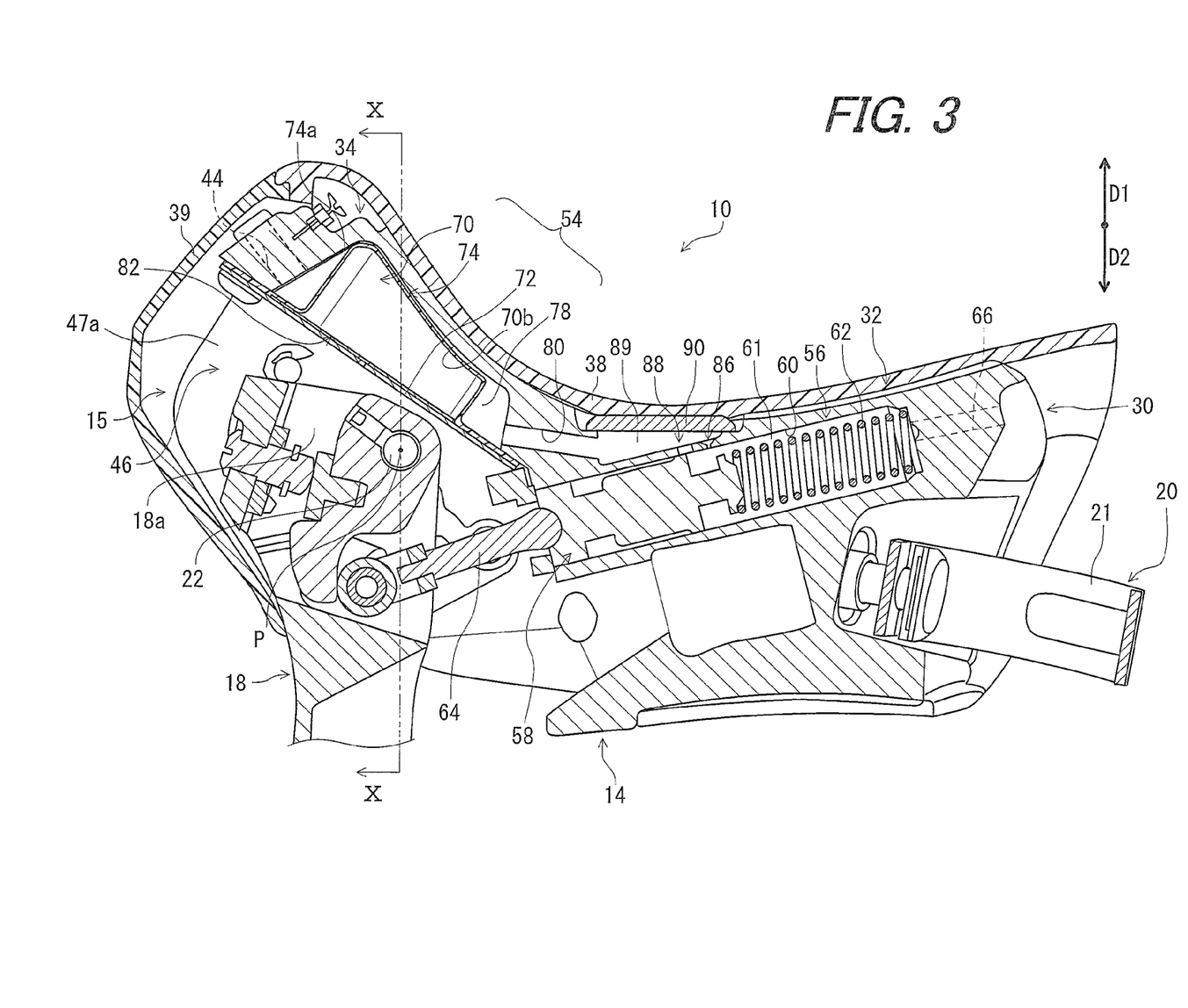
FIG. 3 is a center longitudinal cross sectional view of the bicycle hydraulic operating device illustrated in FIG. 1.

Referring to FIG. 3, the bicycle hydraulic operating device 10 further comprises a hydraulic cylinder 56, a piston 58, a biasing element 62 and a fluid reservoir tank 54. The hydraulic cylinder 56, the piston 58, the biasing element 62 and the fluid reservoir tank 54 constitute the hydraulic system of the bicycle hydraulic operating device 10. The hydraulic cylinder 56 is disposed on the bracket 14 between the pivot axis P of the lever 18 and the mounting member 20 in a longitudinal direction of the bracket 14. In the illustrated embodiment, the hydraulic cylinder 56 is provided in the gripping portion 32 of the bracket 14 and is integrally provided in the gripping portion 32 of the bracket 14 as a one-piece unitary member.

The piston 58 is movably disposed within the hydraulic cylinder 56. More specifically, the hydraulic cylinder 56 includes a cylinder bore 60 extending along the longitudinal axis of the bracket 14. The cylinder bore 60 is open to the receiving space 46. The piston 58 is movable disposed within the cylinder bore 60 in a reciprocal manner in response to operation of the lever 18. The piston 58 and the internal surface of the cylinder bore 60 define a cylinder chamber 61 of the hydraulic cylinder 56. The biasing element 62 is disposed in the cylinder bore 60 for biasing the piston 58 to a rest position. In the illustrated embodiment, the biasing element 62 is a coil compression spring (return spring) that also biases the lever 18 to its rest position as seen in FIG. 3. The hydraulic cylinder 56 has an outlet port 66 that extends from the cylinder bore 60 to a hydraulic hose connector (not shown).

As seen in FIG. 3, the lever 18 is operatively coupled to the piston 58 to move the piston 58 within the hydraulic cylinder 56 in response to pivotal movement of the lever 18. More specifically, the lever 18 is operatively connected to the piston 58 by a connecting rod 64. The connecting rod 64 is connected to the lever 18 with a reach adjustment connection such that a distance between the piston 58 and the lever 18 is adjustable. The reach adjustment connection between the connecting rod 64 and the lever 18 is substantially similar in construction to the reach adjustment connection that is disclosed in U.S. Patent Application Publication No. 2011/0147149 A1 (assigned to Shimano, Inc.), for example.

As the lever 18 is pivoted around the pivot axis P relative to the bracket 14, the piston 58 moves within the cylinder bore 60 of the hydraulic cylinder 56 against the force of the biasing element 62 to force hydraulic fluid out of the cylinder bore 60 through the outlet port 66. Operation of the lever 18 causes hydraulic fluid to move from the hydraulic cylinder 56 to a slave piston or pistons (not shown) in the hydraulic brake device (e.g., hydraulic disc brake caliper or hydraulic rim brake caliper) so as to apply frictional resistance and causing the bicycle to slow down or stop. Of course, the bicycle hydraulic operating device 10 can be applied to any kind of a hydraulic disc brake system.

As illustrated in FIG. 3, the fluid reservoir tank 54 is disposed above the pivot axis P of the lever 18 in a state where the bracket 14 is mounted to the bicycle handlebar 100. The fluid reservoir tank 54 is disposed above the hydraulic cylinder 56 in the pommel portion 34 of the bracket 14. Of course, it will be apparent to those skilled in the bicycle field from this disclosure that a location of the fluid reservoir tank 54 is not limited to the illustrated location, but rather other suitable locations can also be used.

As illustrated in FIG. 3, the fluid reservoir tank 54 includes a fluid reservoir 70, a lid 72, and a flexible diaphragm 74. The fluid reservoir 70 is disposed on the bracket 14 and has an opening 82 configured to face substantially in a downward direction D2 in a state where the bracket 14 is mounted to the bicycle handlebar 100. In the illustrated embodiment, the fluid reservoir 70 is provided in the pommel portion 34 of the bracket 14. The fluid reservoir 70 is integrally provided in the pommel portion 34 of the bracket 14 as a one-piece unitary member. The fluid reservoir 70 is provided as a recess being substantially recessed in an upward direction D1 and open substantially in the downward direction D2 in a state where the bracket 14 is mounted to the bicycle handlebar 100. The opening 82 is disposed at a lower portion of the fluid reservoir 70 in a state where the bracket 14 is mounted to the bicycle handlebar 100. As illustrated in FIG. 3, the hydraulic cylinder 56 and the fluid reservoir 70 are integrally provided as a part of a one-piece unitary member. In other words, the hydraulic cylinder 56 and the fluid reservoir 70 are integrally provided with the bracket 14 as a one-piece unitary member.

The opening 82 of the fluid reservoir 70 is configured to face the receiving space 46. More specifically, the opening 82 of the fluid reservoir 70 is disposed to face the first end portion 18a of the lever 18. The lid 72 is configured to cover the opening 82 of the fluid reservoir 70 and is disposed between the fluid reservoir 70 and the lever 18. More specifically, the lid 72 is disposed between the fluid reservoir 70 and the first end portion 18a of the lever 18. Further, the lid 72 is disposed between the fluid reservoir 70 and the pivot axis P of the lever 18.

The lid 72 is attached to the fluid reservoir 70 together with the flexible diaphragm 74 to cover the opening 82 and the flexible diaphragm 74. The flexible diaphragm 74 is disposed between the lid 72 and the opening 82 of the fluid reservoir 70. The flexible diaphragm 74 includes a protruding part 74a that extends into the fluid reservoir 70. A hydraulic fluid chamber 78 is defined between the fluid reservoir 70 and the flexible diaphragm 74 and is configured to reserve hydraulic fluid therein.

As illustrated in FIG. 3, the hydraulic fluid chamber 78 of the fluid reservoir tank 54 is in fluid communication with the cylinder chamber 61 of the hydraulic cylinder 56 via an internal passageway 80. The internal passageway 80 is provided in the bracket 14 to fluidly connect the hydraulic fluid chamber 78 of the fluid reservoir tank 54 to the cylinder chamber 61 of the hydraulic cylinder 56. The internal passageway 80 includes an enlarged area 89. The enlarged area 89 is disposed closer to the cylinder chamber 61 of the hydraulic cylinder 56 than to the hydraulic fluid chamber 78 of the fluid reservoir tank 54 in the internal passageway 80. A removable plate 90 is fixedly coupled to the bracket 14 to cover or seal the enlarged area 89. The enlarged area 89 includes a timing port 86 and a compensation port 88, both of which are in fluid communication with the cylinder chamber 61 of the hydraulic cylinder 56. The internal passageway 80 is in fluid communication with the cylinder chamber 61 of the hydraulic cylinder 56 via the timing port 86 and the compensation port 88 provided in the enlarged area 89. The functions of the timing port 86 and the compensation port 88 are well known and will not be described further.

Figure 4:
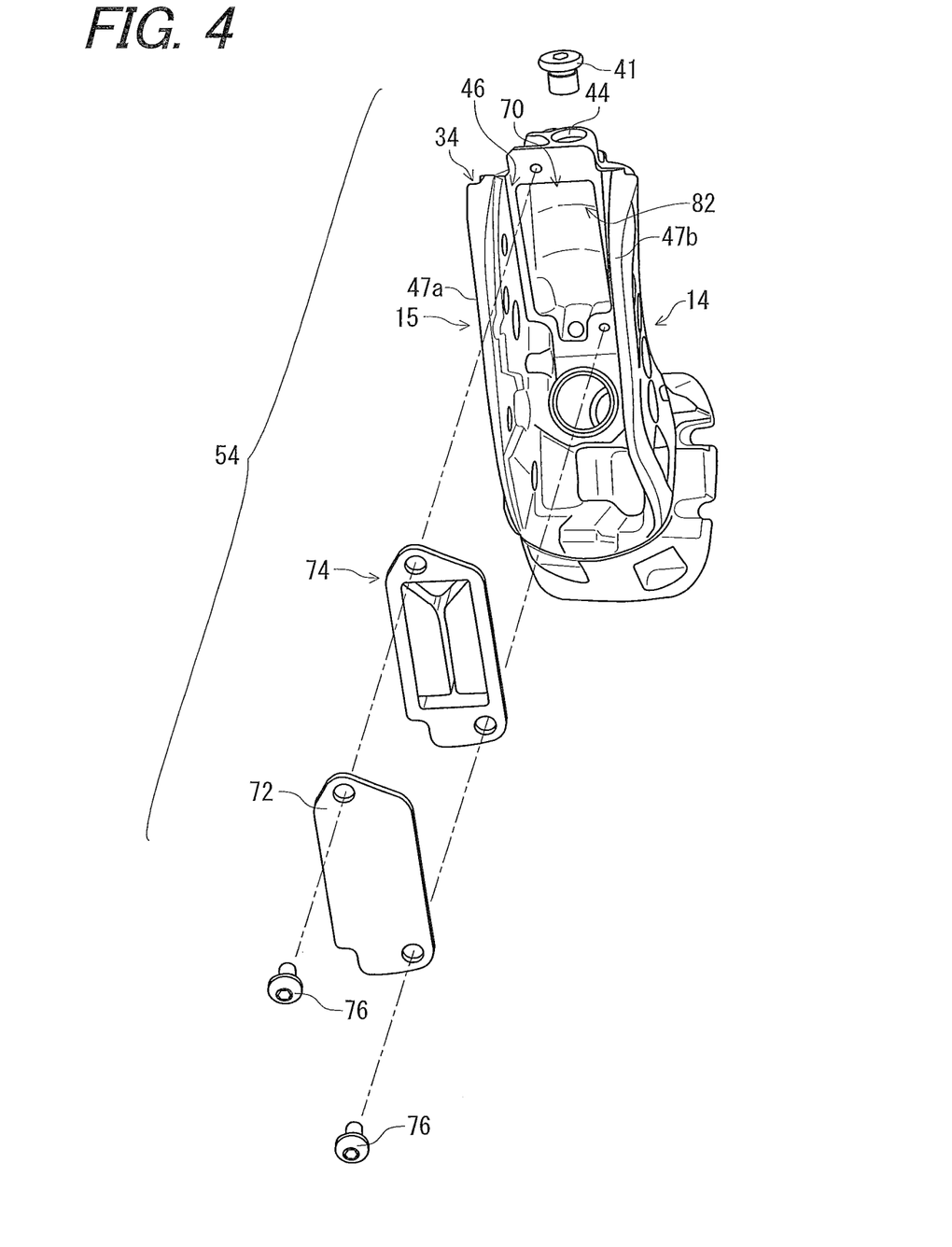
FIG. 4 is an exploded perspective view of a fluid reservoir tank provided in the bicycle hydraulic operating device illustrated in FIG. 3.

As illustrated in FIG. 4, the lid 72 and the flexible diaphragm 74 are attached to the fluid reservoir 70 with screws 76 to cover the opening 82. The flexible diaphragm 74 and the lid 72 are provided in the receiving space 46 defined between the supporting walls 47a and 47b of the lever supporting portion 15. The bicycle hydraulic operating device 10 further comprises a bleeding port 44 provided on the pommel portion 34. The bleeding port 44 is configured to communicate with the fluid reservoir 70. The bleeding port 44 is provided as a funnel mounting portion to which an oil funnel (not shown) is configured to be mounted for adding hydraulic fluid into or for bleeding air from the hydraulic system of the bicycle hydraulic operating device 10. In the illustrated embodiment, the bleeding port 44 is disposed on the bracket 14 at a location primarily forward of the pivot axis P of the lever 18 in a state where the bracket 14 is mounted to the bicycle handlebar 100. The bleeding plug 41 is screwed in the bleeding port 44. It will be apparent to those skilled in the bicycle field from this disclosure that a location of the bleeding port 44 is not limited to the illustrated location, but rather other suitable locations can also be used. The bleeding port 44 can be disposed on lateral side faces of the bracket 14 at the pommel portion 34, for example.

Figure 5:
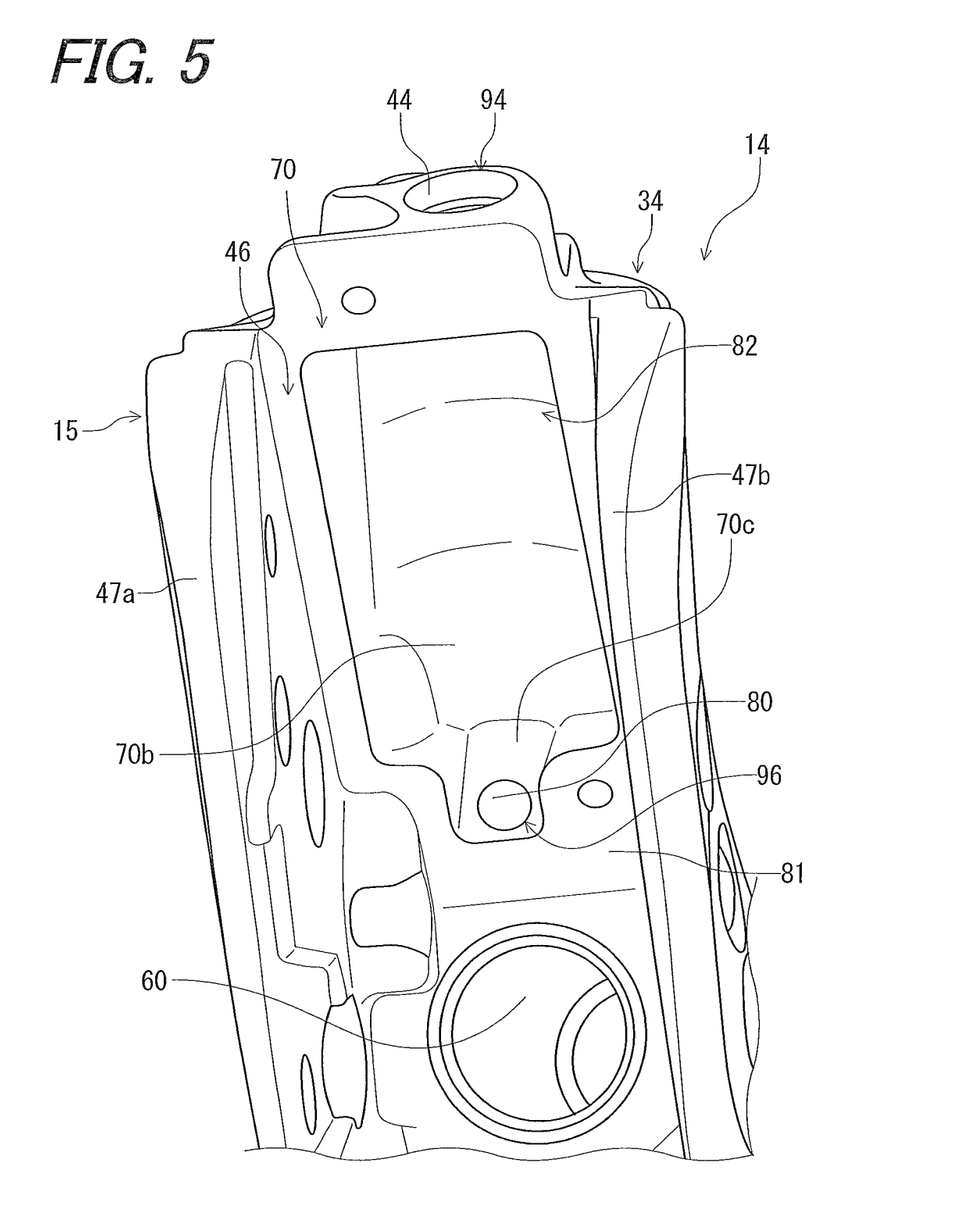
FIG. 5 is a perspective view of a bracket provided in the bicycle hydraulic operating device illustrated in FIG. 3.
Figure 6:
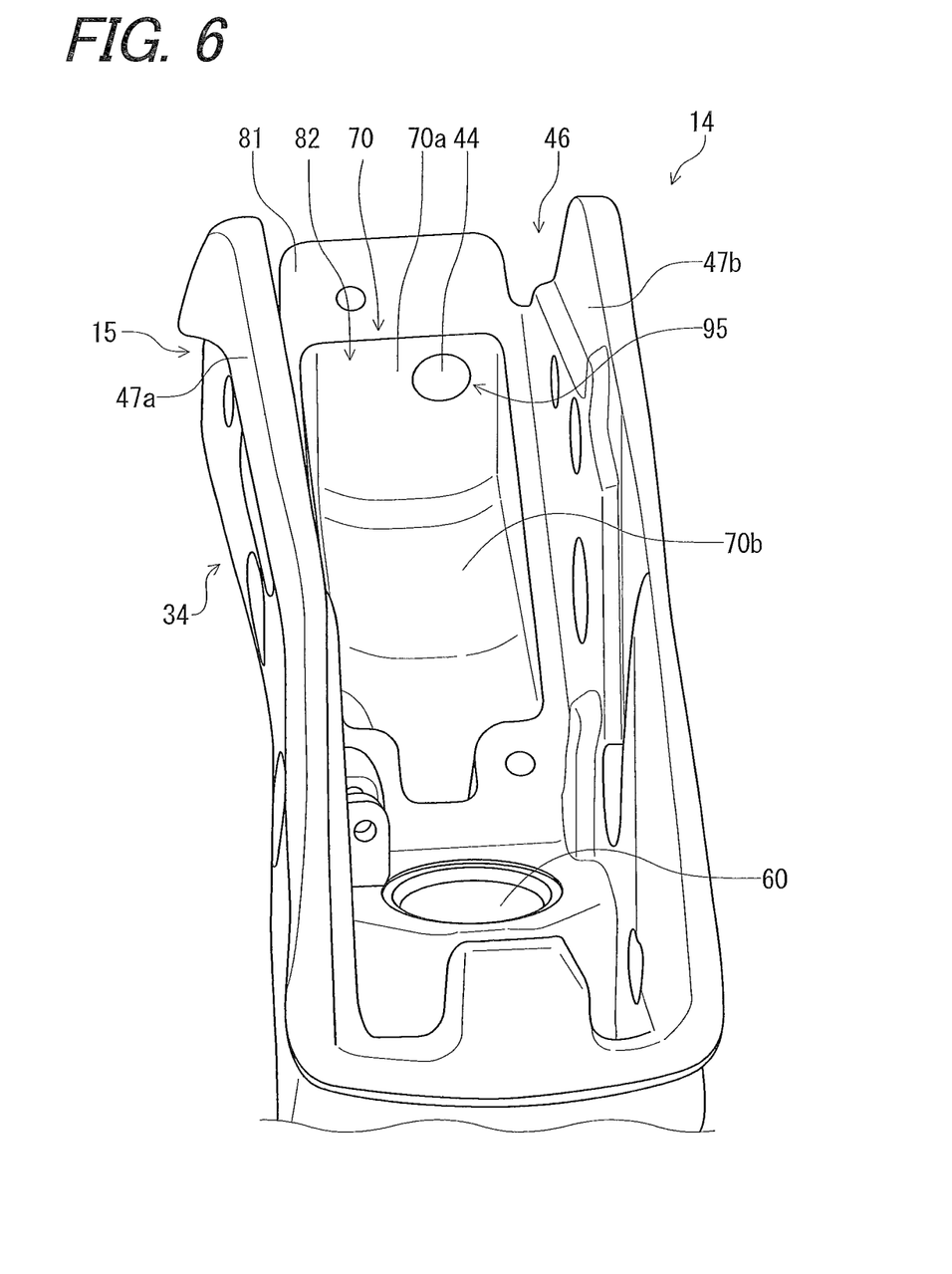
FIG. 6 is a perspective view of the bracket provided in the bicycle hydraulic operating device illustrated in FIG. 3.

Referring to FIG. 5, the bleeding port 44 has an outer end opening 94 provided at the uppermost portion of the bracket 14. The outer end opening 94 of the bleeding port 44 is open into an external space outside the bracket 14. As illustrated in FIG. 6, the bleeding port 44 is provided in a first inner wall surface 70a of the fluid reservoir 70. The bleeding port 44 has an inner end opening 95 provided in the first inner wall surface 70a. The inner end opening 95 of the bleeding port 44 is opposite to the outer end opening 94 (FIG. 5) and is open into the fluid reservoir 70 (the hydraulic fluid chamber 78). Thus, the bleeding port 44 fluidly connects the hydraulic fluid chamber 78 of fluid reservoir 70 with the external space outside the bracket 14. The fluid reservoir 70 includes a ceiling surface 70b.

As illustrated in FIG. 6, the lever supporting portion 15 has an attachment surface 81 which has a flat shape and is disposed around the opening 82 to define the opening 82. The inner end opening 95 is closer to the attachment surface 81 than to the ceiling surface 70b of the fluid reservoir 70. The attachment surface 81 is provided in the receiving space 46 between the supporting walls 47a and 47b of the lever supporting portion 15. The lid 72 and the flexible diaphragm 74 are attached to the attachment surface 81.

As illustrated in FIG. 5, the internal passageway 80 is provided in a second inner wall surface 70c and is disposed on an opposite side of the bleeding port 44 with respect to the fluid reservoir 70. The internal passageway 80 includes an end opening 96 provided in the second inner wall surface 70c. The end opening 96 of the internal passageway 80 is open into the fluid reservoir 70 (the hydraulic fluid chamber 78). Further, the end opening 96 is closer to the attachment surface 81 than to the ceiling surface 70b of the fluid reservoir 70.

Figure 7:
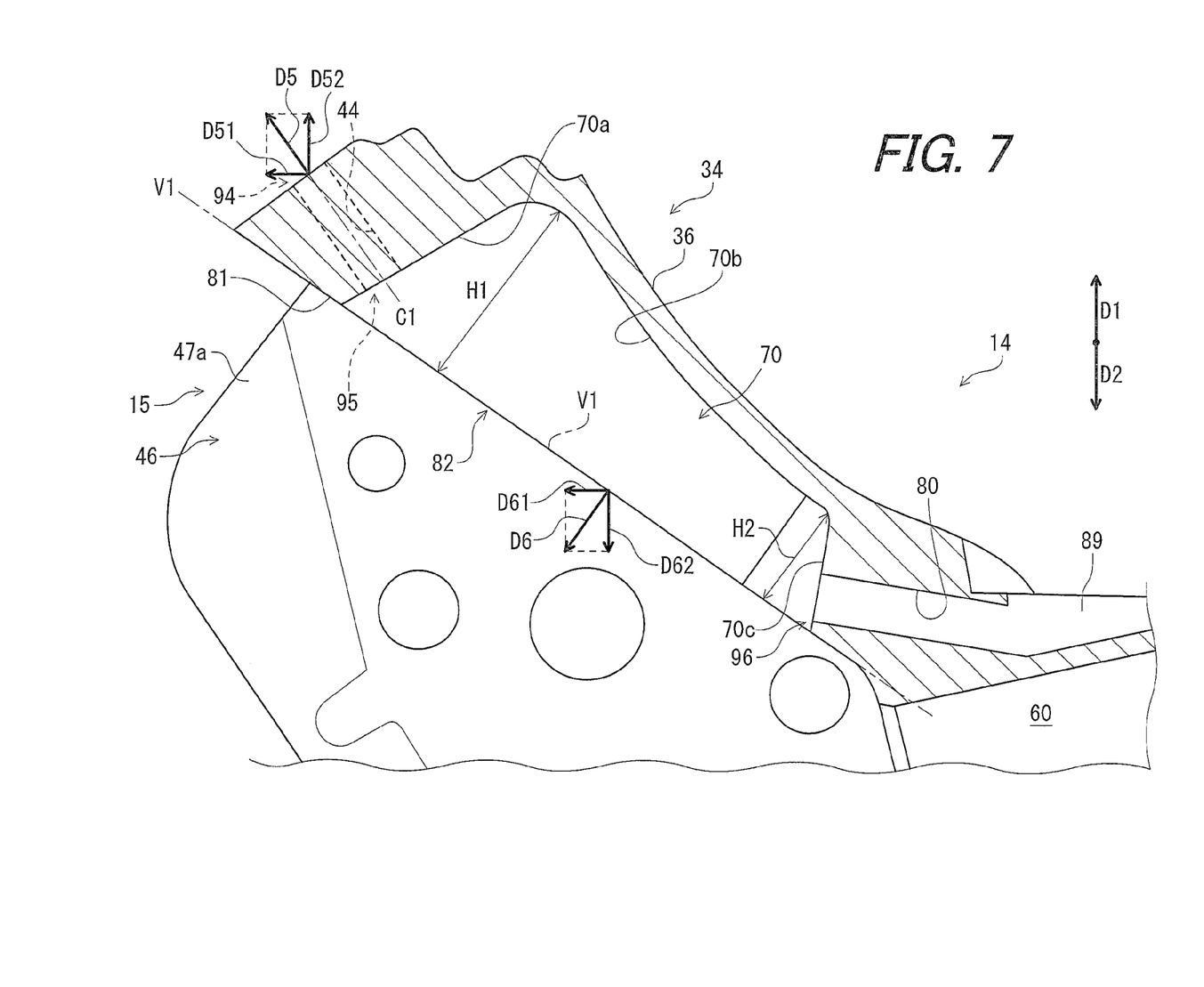
FIG. 7 is a partial cross sectional view of the bracket illustrated in FIG. 6.

As illustrated in FIG. 7, the bleeding port 44 is provided above the opening 82 and is configured to face substantially in the upward direction D1 in a state where the bracket 14 is mounted to the bicycle handlebar 100. The bleeding port 44 extends substantially in the upward direction D1 from the hydraulic fluid chamber 78 (the fluid reservoir 70). The phrase "the bleeding port 44 is configured to face substantially in an upward direction D1" can encompass that the direction D5 in which the bleeding port 44 faces is inclined with respect to the upward direction D1 as well as that the direction D5 is the same as the upward direction D1. Namely, the phrase "the bleeding port 44 is configured to face substantially in an upward direction D1" can encompass that the direction D5 includes a horizontal component D51 and an upward component D52 which is directed in the same direction as the upward direction D1.

The direction D5 in which the bleeding port 44 faces can be defined as a direction which is parallel to a center line C1 of the bleeding port 44 and which is directed to an opposite side of the fluid reservoir 70. The bleeding port 44 extends along the center line C1. The center line C1 of the bleeding port 44 is inclined with respect to the vertical direction (the upward direction D1). It will be apparent to those skilled in the bicycle field that the direction D5 of the bleeding port 44 can be parallel to the upward direction D1 and can be inclined with respect to the upward direction D1. The outer end opening 94 of the bleeding port 44 is open substantially in the upward direction D1. The outer end opening 94 and the inner end opening 95 of the bleeding port 44 are disposed above the opening 82 of the fluid reservoir 70.

As seen in FIG. 7, the opening 82 is configured to face substantially in the downward direction D2 in a state where the bracket 14 is mounted to the bicycle handlebar 100. The opening 82 is configured to face the receiving space 46 defined between the supporting walls 47a and 47b of the lever supporting portion 15 in a state where the bracket 14 is mounted to the bicycle handlebar 100. As well as the opening 82, the attachment surface 81 is provided to face substantially in the downward direction D2 and provided to face the receiving space 46 in a state where the bracket 14 is mounted to the bicycle handlebar 100. The attachment surface 81 is inclined relative to a vertical direction (the upward direction D1 and the downward direction D2) in a state where the bracket 14 is mounted to the bicycle handlebar 100.

The phrase "the opening 82 is configured to face substantially in the downward direction D2" can encompass that the direction D6 in which the opening 82 faces is inclined with respect to the downward direction D2 as well as that the direction D6 is the same as the downward direction D2. Namely, the phrase "the opening 82 is configured to face substantially in the downward direction D2" can encompass that the direction D6 includes a horizontal component D61 and a downward component D62 which is directed in the same direction as the downward direction D2. The direction D6 in which the opening 82 faces can be defined as a direction which is perpendicular to a virtual surface V1 defined by the opening 82 and which is directed to an opposite side of the fluid reservoir 70 with respect to the opening 82, for example.

In the illustrated embodiment, the virtual surface V1 is parallel to the attachment surface 81, and the attachment surface 81 is provided on the virtual surface V1. It will be apparent to those skilled in the bicycle field that the direction D6 of the opening 82 can be parallel to the downward direction D2 and can be inclined with respect to the downward direction D2.

The ceiling surface 70b is provided to face substantially in the downward direction D2 in a state where the bracket 14 is mounted to the bicycle handlebar 100. The ceiling surface 70b is provided along the top surface 36 of the bracket 14 (the top surface 36 of the pommel portion 34). The ceiling surface 70b is curved along the top surface 36 of the pommel portion 34 and has a curved shape such that a front end of the ceiling surface 70b is higher than a rear end of the ceiling surface 70b. As seen in FIG. 7, a distance H1 between the attachment surface 81 and the front end of the ceiling surface 70b is greater than a distance H2 between the attachment surface 81 and the rear end of the ceiling surface 70b when viewed from a direction of the pivot axis P. The ceiling surface 70b and the first inner wall surface 70a are disposed above the second inner wall surface 70c and the opening 82 in a state where the bracket 14 is mounted to the bicycle handlebar 100.

Figure 8:
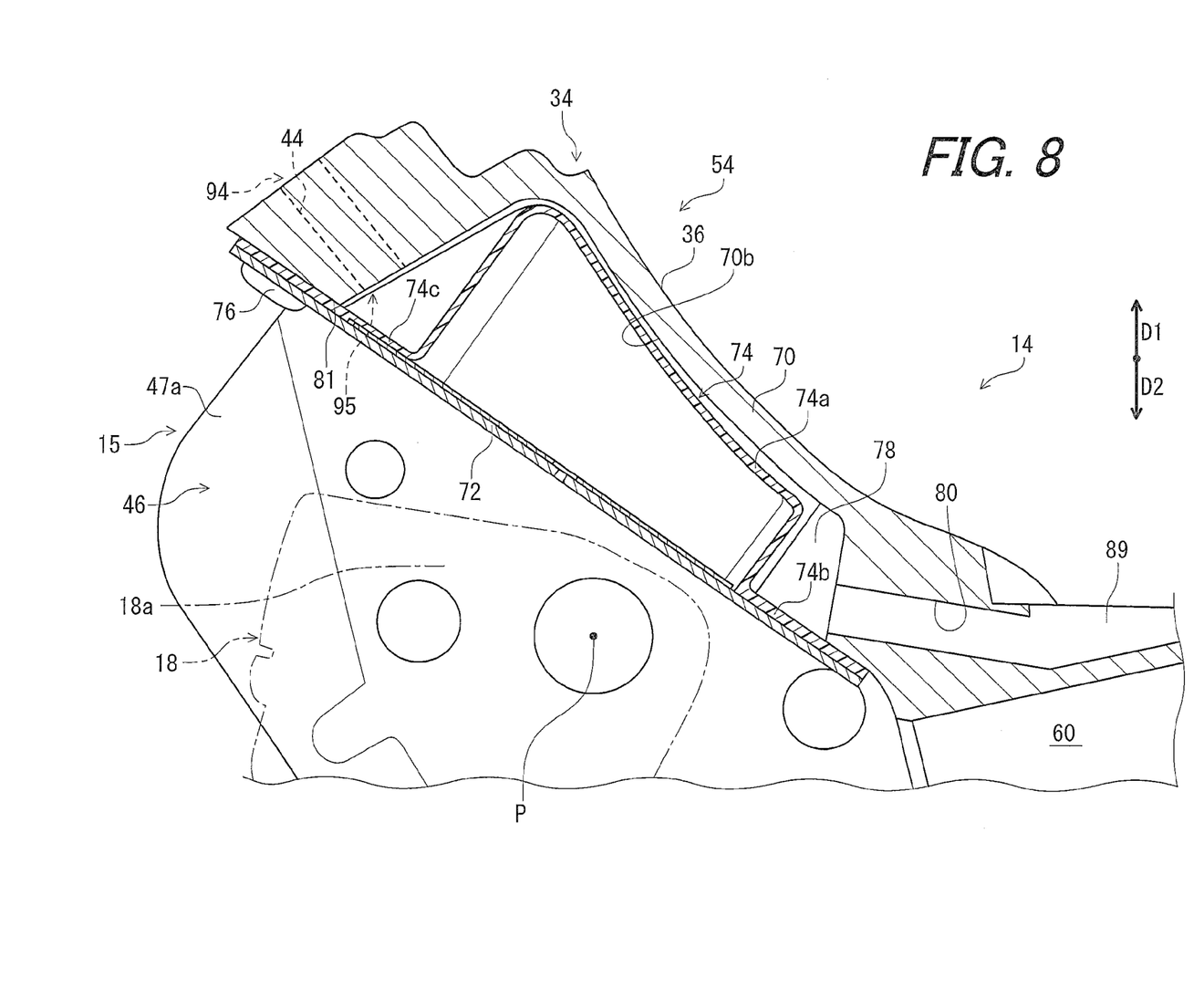
FIG. 8 is a partial cross sectional view of the fluid reservoir tank illustrated in FIG. 4.

As illustrated in FIG. 8, the protruding part 74a of the flexible diaphragm 74 is provided in the fluid reservoir 70. The flexible diaphragm 74 is made of elastic material such as rubber to be deformable in the fluid reservoir 70. The flexible diaphragm 74 and the lid 72 are attached to the attachment surface 81 of the lever supporting portion 15 with the screws 76 (FIG. 4) to cover the opening 82.

Figure 9A:
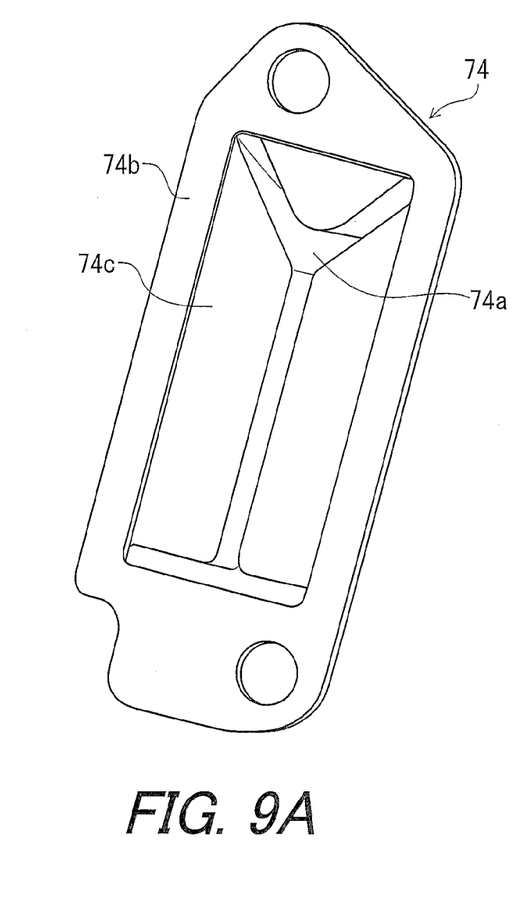
FIGS. 9A and 9B are perspective views of a flexible diaphragm provided in the fluid reservoir tank illustrated in FIG. 8.
Figure 9B:
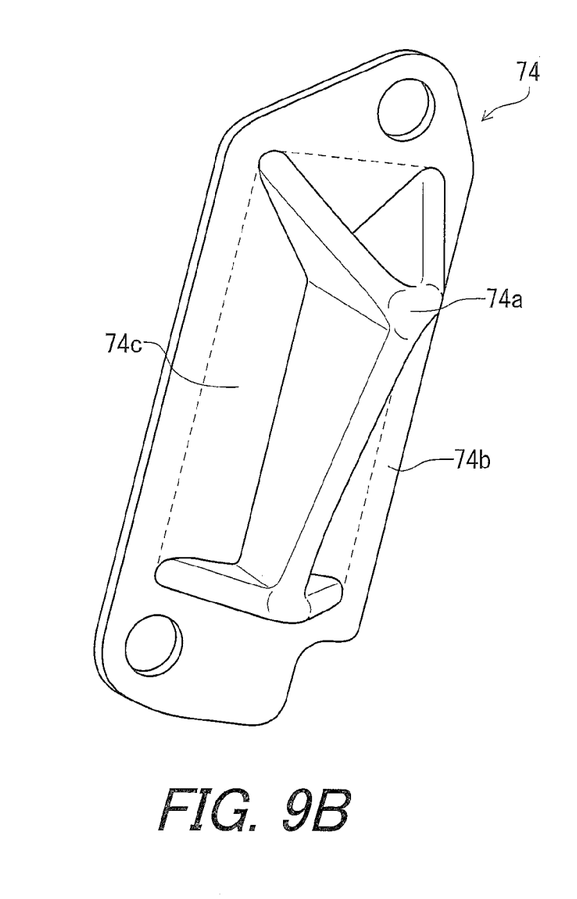

As illustrated in FIGS. 9A and 9B, the flexible diaphragm 74 includes the protruding part 74a, a flange part 74b, and a thinner part 74c. The flange part 74b has a plate shape and is configured to contact the attachment surface 81. The flange part 74b is provided around an outer periphery of the thinner part 74c. The thinner part 74c has a plate shape and is provided within the flange part 74b. A thickness of the thinner part 74c is smaller than a thickness of the flange part 74b. The protruding part 74a protrudes from the thinner part 74c and provides a slit or recess at the receiving space 46 side of the thinner part 74c. A thickness of the protruding part 74a is substantially the same as the thickness of the thinner part 74c and smaller than the thickness of the flange part 74b. The protruding part 74a and the thinner part 74c are deformable to change the capacity of the hydraulic fluid chamber 78.

As illustrated in FIG. 8, the flange part 74b is provided between the attachment surface 81 and the lid 72. The lid 72 has a plate shape and is made of metallic material such as aluminum alloy or iron. The lid 72 and the flange part 74b are inclined relative to the vertical direction (the upward direction D1 and the downward direction D2) in a state where the bracket 14 is mounted to the bicycle handlebar 100, as well as the attachment surface 81. The lid 72 and the flange part 74b are disposed along the attachment surface 81. The lid 72 and the flange part 74b are disposed substantially along the top surface 36 of the pommel portion 34 of the bracket 14.

Figure 10:
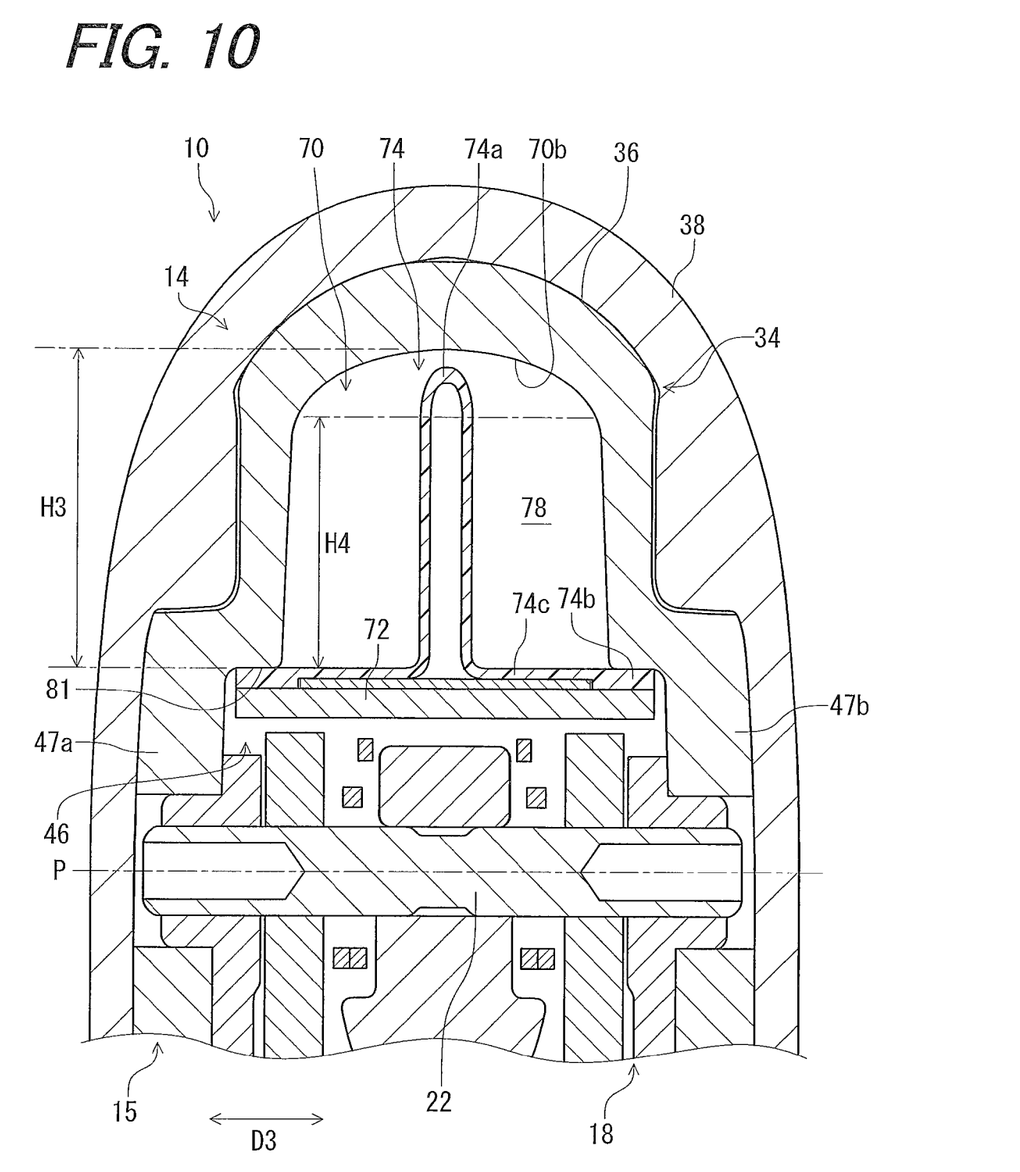
FIG. 10 is a cross sectional view taken along line X-X of FIG. 3.

Referring to FIG. 10, the protruding part 74a of the flexible diaphragm 74 is disposed at a substantially middle position in the hydraulic fluid chamber 78 (the fluid reservoir 70) in a transverse direction D3 defined along the pivot axis P. The ceiling surface 70b is provided on an opposite side of the top surface 36 of the bracket 14 (the top surface 36 of the pommel portion 34) and is curved along the top surface 36 of the pommel portion 34. The ceiling surface 70b has a curved shape such that a transverse center of the ceiling surface 70b is higher than transverse ends of the ceiling surface 70b. A distance H3 between the attachment surface 81 and the transverse center of the ceiling surface 70b is greater than a distance H4 between the attachment surface 81 and the transverse ends of the ceiling surface 70b. The protruding part 74a of the flexible diaphragm 74 is disposed under the transverse center of the ceiling surface 70b.

As seen in FIG. 8, when the hydraulic fluid is added into the hydraulic system of the bicycle hydraulic operating device 10, the front cover 39 is removed from the bracket 14, and the bleeding plug 41 is removed from the bleeding port 44. An oil funnel (not shown) is attached to the bleeding port 44 from the outer end opening 94. When the hydraulic fluid is added into the hydraulic system of the bicycle hydraulic operating device 10 from the oil funnel, the outer end opening 94 of the bleeding port 44 serves as an inlet of the fluid reservoir tank 54 for bleeding hydraulic fluid into the cylinder bore 60. In this case, the hydraulic fluid flows into the cylinder bore 60 via the bleeding port 44, the fluid reservoir tank 54 and the internal passageway 80. Furthermore, the hydraulic fluid drains out of the outlet port 66 (FIG. 3) towards the bicycle brake device that is fluidly coupled to the bicycle hydraulic operating device 10 via the hydraulic hose (not shown).

On the other hand, when the hydraulic fluid is added into the hydraulic system of the bicycle hydraulic operating device 10 from the hydraulic brake device via the hydraulic hose or when the air in the hydraulic system is bled out of the hydraulic system, the outer end opening 94 of the bleeding port 44 serves as an outlet of the fluid reservoir tank 54 for bleeding hydraulic fluid into the cylinder bore 60 from the hydraulic hose or for bleeding air out of the hydraulic system. In this case, when the hydraulic fluid is added to the hydraulic system from a bleed nipple of the hydraulic brake device using a syringe (not shown), the hydraulic fluid flows into the fluid reservoir tank 54 via the hydraulic hose, the outlet port 66, the cylinder bore 60 and the internal passageway 80 to fill the fluid reservoir tank 54. Excess hydraulic fluid of the fluid reservoir tank 54 overflows out of the outer end opening 94 of the bleeding port 44 into the oil funnel. Furthermore, air included in the hydraulic fluid in the hydraulic system is also bled from the outer end opening 94 of the bleeding port 44.

With the bicycle hydraulic operating device 10 according to the embodiment, since the opening 82 of the fluid reservoir 70 is configured to face substantially in the downward direction D2 in a state where the bracket 14 is mounted to the bicycle handlebar 100, it is possible to adjust an upper shape of the fluid reservoir 70 to the outer shape (e.g., the top surface 36 of the bracket 14) of the bicycle hydraulic operating device 10. Accordingly, an interior of the bicycle hydraulic operating device 10 can be effectively utilized, which allows the bicycle hydraulic operating device 10 to be more compact.

With the bicycle hydraulic operating device 10 according to the embodiment, since the opening 82 of the fluid reservoir 70 is configured to face the receiving space 46, the receiving space 46 can be effectively utilized as a space in which the lid 72 is disposed. Accordingly, an interior of the bicycle hydraulic operating device 10 can be effectively utilized, which allows the bicycle hydraulic operating device 10 to be more compact.

Furthermore, with the bicycle hydraulic operating device 10 according to the embodiment, since the lid 72 is disposed between the fluid reservoir 70 and the lever 18, the space between the fluid reservoir 70 and the lever 18 can be effectively utilized. Accordingly, an interior of the bicycle hydraulic operating device 10 can be effectively utilized, which allows the bicycle hydraulic operating device 10 to be more compact.

In understanding the scope of the present invention, as used herein to describe the above embodiment(s), the following directional terms "forward", "rearward", "left", "right", "upward" and "downward" as well as any other similar directional terms refer to those directions which are determined on the basis of the rider who sits on a saddle (not shown) of a bicycle with facing a handlebar of the bicycle. Accordingly, these terms, as utilized to describe the bicycle hydraulic operating device should be interpreted relative to a bicycle equipped with the bicycle hydraulic operating device as used in an upright riding position on a horizontal surface.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This definition also applies to words of similar meaning, for example, the terms "have", "include" and their derivatives.

The terms "member", "section," "portion," "part" or "element" when used in the singular can have the dual meaning of a single part or a plurality of parts.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle hydraulic operating device comprising:
   a bracket configured to be mounted to a dropdown bicycle handlebar;
   a hydraulic cylinder;
   a piston movably disposed within the hydraulic cylinder;
   a lever pivotally provided around a pivot axis relative to the bracket and operatively coupled to the piston to move the piston within the hydraulic cylinder in response to pivotal movement of the lever;
   a fluid reservoir disposed on the bracket and having an opening provided on a downward surface of the fluid reservoir and configured to face substantially in a downward direction in a state where the bracket is mounted to the dropdown bicycle handlebar; and
   a lid fixed to the fluid reservoir and configured to cover the opening of the fluid reservoir on the downward surface, wherein
   the bracket includes a handlebar attachment portion, a pommel portion, and a gripping portion disposed between the handlebar attachment portion and the pommel portion, and
   the pommel portion extends upwardly with respect to the gripping portion in the state where the bracket is mounted to the dropdown bicycle handlebar.

2. The bicycle hydraulic operating device according to claim 1, wherein
   the lid is disposed between the fluid reservoir and the lever.

3. The bicycle hydraulic operating device according to claim 2, wherein
   the lid is disposed between the fluid reservoir and the pivot axis of the lever.

4. The bicycle hydraulic operating device according to claim 1, wherein
   the lever includes a first end portion and a second end portion opposite to the first end portion, the pivot axis being provided closer to the first end portion than to the second end portion, and
   the lid is disposed between the fluid reservoir and the first end portion.

5. The bicycle hydraulic operating device according to claim 1, further comprising:
   a flexible diaphragm disposed in the fluid reservoir.

6. The bicycle hydraulic operating device according to claim 1, wherein
   the bracket includes a mounting member configured to mount the bracket to the bicycle handlebar, and
   the hydraulic cylinder is disposed on the bracket between the pivot axis of the lever and the mounting member.

7. The bicycle hydraulic operating device according to claim 1, further comprising:
   an electric switch unit provided on the lever and configured to be electrically connected to a bicycle electric component.

8. The bicycle hydraulic operating device according to claim 1, further comprising:
   a bleeding port configured to communicate with the fluid reservoir.

9. The bicycle hydraulic operating device according to claim 8, wherein
   the bleeding port is configured to face substantially in an upward direction in a state where the bracket is mounted to the bicycle handlebar.

10. A hydraulic operating device comprising:
    a bracket configured to be mounted to a dropdown bicycle handlebar;
    a lever supporting portion having a receiving space;
    a hydraulic cylinder;
    a piston movably disposed within the hydraulic cylinder;
    a lever pivotally supported by the lever supporting portion around a pivot axis relative to the bracket and partially disposed at the receiving space, the lever being operatively coupled to the piston to move the piston within the hydraulic cylinder in response to pivotal movement of the lever;
    a fluid reservoir disposed on the bracket and having an opening provided on a downward surface of the fluid reservoir and configured to face the receiving space; and
    a lid fixed to the fluid reservoir and configured to cover the opening of the fluid reservoir on the downward surface, wherein
    the bracket includes a handlebar attachment portion, a pommel portion, and a gripping portion disposed between the handlebar attachment portion and the pommel portion, and
    the pommel portion extends upwardly with respect to the gripping portion in a state where the bracket is mounted to the dropdown bicycle handlebar.

11. A bicycle hydraulic operating device comprising:
    a bracket configured to be mounted to a dropdown bicycle handlebar;
    a hydraulic cylinder;
    a piston configured to be movably provided within the hydraulic cylinder;
    a lever pivotally provided about a pivot axis relative to the hydraulic cylinder and operatively coupled to the piston to move the piston within the hydraulic cylinder in response to pivotal movement of the lever;
    a fluid reservoir disposed on the bracket and having an opening provided on a downward surface of the fluid reservoir; and
    a lid fixed to the fluid reservoir and configured to cover the opening of the fluid reservoir on the downward surface and provided between the fluid reservoir and the lever, wherein the bracket includes a handlebar attachment portion, a pommel portion, and a gripping portion disposed between the handlebar attachment portion and the pommel portion, and the pommel portion extends upwardly with respect to the gripping portion in a state where the bracket is mounted to the dropdown bicycle handlebar.

12. A bicycle hydraulic operating device comprising:
a bracket configured to be mounted to a dropdown bicycle handlebar;
a hydraulic cylinder;
a piston movably disposed within the hydraulic cylinder;
a lever pivotally provided around a pivot axis relative to the bracket and operatively coupled to the piston to move the piston within the hydraulic cylinder in response to pivotal movement of the lever;
a fluid reservoir disposed on the bracket and having an opening configured to face substantially in a downward direction in a state where the bracket is mounted to the dropdown bicycle handlebar; and
a lid configured to cover the opening of the fluid reservoir, wherein
the bracket includes a handlebar attachment portion, a pommel portion, and a gripping portion disposed between the handlebar attachment portion and the pommel portion,
the pommel portion extends upwardly with respect to the gripping portion in the state where the bracket is mounted to the dropdown bicycle handlebar, and
the fluid reservoir is provided within the pommel portion.

13. The bicycle hydraulic operating device according to claim 12, wherein
the fluid reservoir is disposed above the hydraulic cylinder.

14. The bicycle hydraulic operating device according to claim 8, wherein
the bleeding port is provided on the pommel portion.

15. The bicycle hydraulic operating device according to claim 1, wherein
the hydraulic cylinder is provided within the gripping portion.

16. A hydraulic operating device comprising:
a bracket configured to be mounted to a dropdown bicycle handlebar;
a lever supporting portion having a receiving space;
a hydraulic cylinder;
a piston movably disposed within the hydraulic cylinder;
a lever pivotally supported by the lever supporting portion around a pivot axis relative to the bracket and partially disposed at the receiving space, the lever being operatively coupled to the piston to move the piston within the hydraulic cylinder in response to pivotal movement of the lever;
a fluid reservoir disposed on the bracket and having an opening configured to face the receiving space; and
a lid configured to cover the opening of the fluid reservoir, wherein
the bracket includes a handlebar attachment portion, a pommel portion, and a gripping portion disposed between the handlebar attachment portion and the pommel portion,
the pommel portion extends upwardly with respect to the gripping portion in a state where the bracket is mounted to the dropdown bicycle handlebar, and
the fluid reservoir is provided within the pommel portion.

17. The hydraulic operating device according to claim 16, wherein
the fluid reservoir is disposed above the hydraulic cylinder.

18. The hydraulic operating device according to claim 10, further comprising:
a bleeding port configured to communicate with the fluid reservoir, wherein
the bleeding port is provided on the pommel portion.

19. The hydraulic operating device according to claim 10, wherein
the hydraulic cylinder is provided within the gripping portion.

20. A bicycle hydraulic operating device comprising:
a bracket configured to be mounted to a dropdown bicycle handlebar;
a hydraulic cylinder;
a piston configured to be movably provided within the hydraulic cylinder;
a lever pivotally provided about a pivot axis relative to the hydraulic cylinder and operatively coupled to the piston to move the piston within the hydraulic cylinder in response to pivotal movement of the lever;
a fluid reservoir disposed on the bracket and having an opening; and
a lid configured to cover the opening of the fluid reservoir and provided between the fluid reservoir and the lever, wherein
the bracket includes a handlebar attachment portion, a pommel portion, and a gripping portion disposed between the handlebar attachment portion and the pommel portion,
the pommel portion extends upwardly with respect to the gripping portion in a state where the bracket is mounted to the dropdown bicycle handlebar, and
the fluid reservoir is provided within the pommel portion.

21. The bicycle hydraulic operating device according to claim 20, wherein
the fluid reservoir is disposed above the hydraulic cylinder.

22. The bicycle hydraulic operating device according to claim 11, further comprising:
a bleeding port configured to communicate with the fluid reservoir, wherein
the bleeding port is provided on the pommel portion.

23. The bicycle hydraulic operating device according to claim 11, wherein
the hydraulic cylinder is provided within the gripping portion.

24. The bicycle hydraulic operating device according to claim 1, wherein
the lid is made of metallic material.

25. The hydraulic operating device according to claim 10, wherein
the lid is made of metallic material.

26. The hydraulic operating device according to claim 10, further comprising:
a flexible diaphragm disposed in the fluid reservoir.

27. The bicycle hydraulic operating device according to claim 11, wherein
the lid is made of metallic material.

28. The bicycle hydraulic operating device according to claim 11, further comprising:
a flexible diaphragm disposed in the fluid reservoir.

* * * * *